(12) United States Patent
Elliott et al.

(10) Patent No.: US 12,498,989 B2
(45) Date of Patent: Dec. 16, 2025

(54) SOFTWARE CONTAINERS

(71) Applicant: Hewlett-Packard Development Company, L.P., Spring, TX (US)

(72) Inventors: Trey Elliott, Spring, TX (US); Thomas Flynn, Spring, TX (US); Srivatsan Mani, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 300 days.

(21) Appl. No.: 17/774,186

(22) PCT Filed: Nov. 19, 2019

(86) PCT No.: PCT/US2019/062125
§ 371 (c)(1),
(2) Date: May 4, 2022

(87) PCT Pub. No.: WO2021/101516
PCT Pub. Date: May 27, 2021

(65) Prior Publication Data
US 2022/0413936 A1 Dec. 29, 2022

(51) Int. Cl.
*G06F 9/50* (2006.01)
*G06F 21/44* (2013.01)
*G06F 21/60* (2013.01)

(52) U.S. Cl.
CPC ............ *G06F 9/5077* (2013.01); *G06F 21/44* (2013.01); *G06F 21/602* (2013.01)

(58) Field of Classification Search
None
See application file for complete search history.

(56) References Cited

U.S. PATENT DOCUMENTS

| | | | |
|---|---|---|---|
| 8,316,237 B1 * | 11/2012 | Felsher | H04L 63/061 |
| | | | 380/282 |
| 9,521,115 B1 | 12/2016 | Woolward | |
| 10,346,143 B2 | 7/2019 | Engquist et al. | |
| 10,742,421 B1 * | 8/2020 | Wentz | H04L 9/0897 |

(Continued)

FOREIGN PATENT DOCUMENTS

| | | |
|---|---|---|
| WO | 2019/133298 A1 | 7/2019 |
| WO | 2019/133326 A1 | 7/2019 |

OTHER PUBLICATIONS

Collins, K., "When to Use Containers or Virtual Machines, And Why", retrieved at https://www.nextplatform.com/2015/08/06/containers-versus-virtual-machines-when-to-use-each-one-and-why/, The Next Platform, Aug. 6, 2015, 9 pages.

(Continued)

*Primary Examiner* — Philip J Chea
*Assistant Examiner* — James Ross Hollister
(74) *Attorney, Agent, or Firm* — Quarles & Brady LLP (57) ABSTRACT

An example system may include a processor and a non-transitory machine-readable storage medium storing instructions executable by the processor to validate a software container, stored on a hardware controller embedded in a computing device, utilizing an encryption mechanism specific to the computing device; insert an instance of the software container, responsive to a successful validation of the software container, from the hardware controller into an operating system of the computing device.

20 Claims, 4 Drawing Sheets

(56) References Cited

U.S. PATENT DOCUMENTS

| | | | |
|---|---|---|---|
| 2006/0053417 A1* | 3/2006 | Henderson | G06F 9/442 |
| | | | 717/168 |
| 2017/0180346 A1* | 6/2017 | Suarez | G06F 9/45558 |
| 2018/0293700 A1 | 10/2018 | Tian et al. | |
| 2018/0349610 A1* | 12/2018 | Gupta | G06F 9/5077 |
| 2019/0042756 A1* | 2/2019 | Lal | H04L 9/3234 |
| 2019/0228166 A1* | 7/2019 | Smith | G06F 21/606 |
| 2019/0235861 A1 | 8/2019 | Suarez et al. | |
| 2019/0258782 A1* | 8/2019 | Lerner | G07C 9/257 |
| 2020/0310662 A1* | 10/2020 | Staab | G06F 21/44 |
| 2021/0133312 A1* | 5/2021 | Sugandhi | G06F 21/57 |
| 2022/0171648 A1* | 6/2022 | Rodriguez | G06F 9/45533 |

OTHER PUBLICATIONS

VSphere, "vSphere Integrated Containers", VMware, retrieved at https://www.vmware.com/products/vsphere/integrated-containers.html, retrieved on Sep. 23, 2019, 7 pages.

\* cited by examiner

SOFTWARE CONTAINERS

BACKGROUND

The software industry has adopted a microservice architecture. A microservice architecture may include an architectural style that structures a software application as a collection of services. Each of the services may run its own process and communicate with lightweight mechanisms such as an HTTP resource application program interface (API). The services may be independently deployable and may be written in different programming languages and/or utilize different data storage technologies.

In some examples, microservices may be deployed utilizing small footprint containers. The containers may reside in a computing cloud. The containers may be pulled down from the computing cloud and installed to a local hard drive of a computing device where they will be executed. In some examples, the computing device where the container will be deployed may utilize a network connection, such as an Internet connection to retrieve the containers from the cloud.

DETAILED DESCRIPTION

A software container, as utilized herein, may include a lightweight, standalone, executable package of instructions that may include the components to run an application such as the instructions, runtime, system tools, system libraries, settings, frameworks, etc. The software containers may share a same host operating system (OS) kernel. The software containers may communicate with and/or utilize the resources of a local computing device and its OS to execute its functionality. Since the software containers contain not just the instructions, but also the dependencies including libraries, binaries and configuration files, all together, that may be migrated as a unit, the differences between machines including OS differences and underlying hardware that lead to incompatibilities and crashes may be avoided.

Software containers may be stored remotely from the computing device. For example, the software containers may be stored on servers and/or computing clouds remote from the computing device. A computing device may retrieve a software container from the remote servers and/or computing clouds. For example, the computing device may access a website to download a software container. The computing device may execute the retrieved software container utilizing the resources of the computing device.

Security vulnerabilities may impact software containers just like any other legacy instruction framework. As such, software containers may be scanned for vulnerabilities and compliance issues and validated utilizing various security protocols. In some examples, a developer, vendor, and/or distributor of a software container may electronically sign the software container. The developer, vendor, and/or distributor of the software container may store a copy of their key at the computing device. The computing device may utilize the key of the developer, vendor, and/or distributor of the software container to validate the electronic signature of the software container to confirm that the software container is a genuine product of the developer, vendor, and/or distributor.

However, the electronic signature of a software container and/or a key of the developer, vendor, and/or distributor of the software container may be compromised. As a result, software containers that are not genuine, contain nefarious or erroneous code, and/or are not authorized to be operated at the computing device may be erroneously validated and launched at the computing device. The danger of encountering falsely validating software containers may be intensified by virtue of the software containers being retrieved from websites. The websites hosting software containers may include legitimate websites that are vulnerable to attack and/or illegitimate websites masquerading as legitimate websites, the validity of which may not be easily assessed by a user and/or administrator. As such, erroneous, harmful, and/or unauthorized software containers may be obtained by a computing device, despite being seemingly valid.

In contrast, examples consistent with the present disclosure may include a system including software containers that may be shipped on the computing device and validated utilizing a root of trust unique to the computing device. That is, examples consistent with the present disclosure may not rely on retrieving the software containers from websites and utilizing developer, vendor, and/or distributor keys to validate, but may include a system of software containers, software container validation, and/or software container use that is entirely local to a computing device and does not involve reliance on the less secure method of retrieving software containers from websites and/or validating the software utilizing the more generic and vulnerable software container developer, vendor, and/or distributor key. For example, examples consistent with the present disclosure may include a system comprising a processor and a non-transitory machine-readable storage medium to store instructions executable by the processor to validate a software container, stored on a hardware controller embedded in a computing device, utilizing an encryption mechanism specific to the computing device; and insert an instance of the software container, responsive to a successful validation of the software container, from the hardware controller into an operating system of the computing device.

Figure 1:
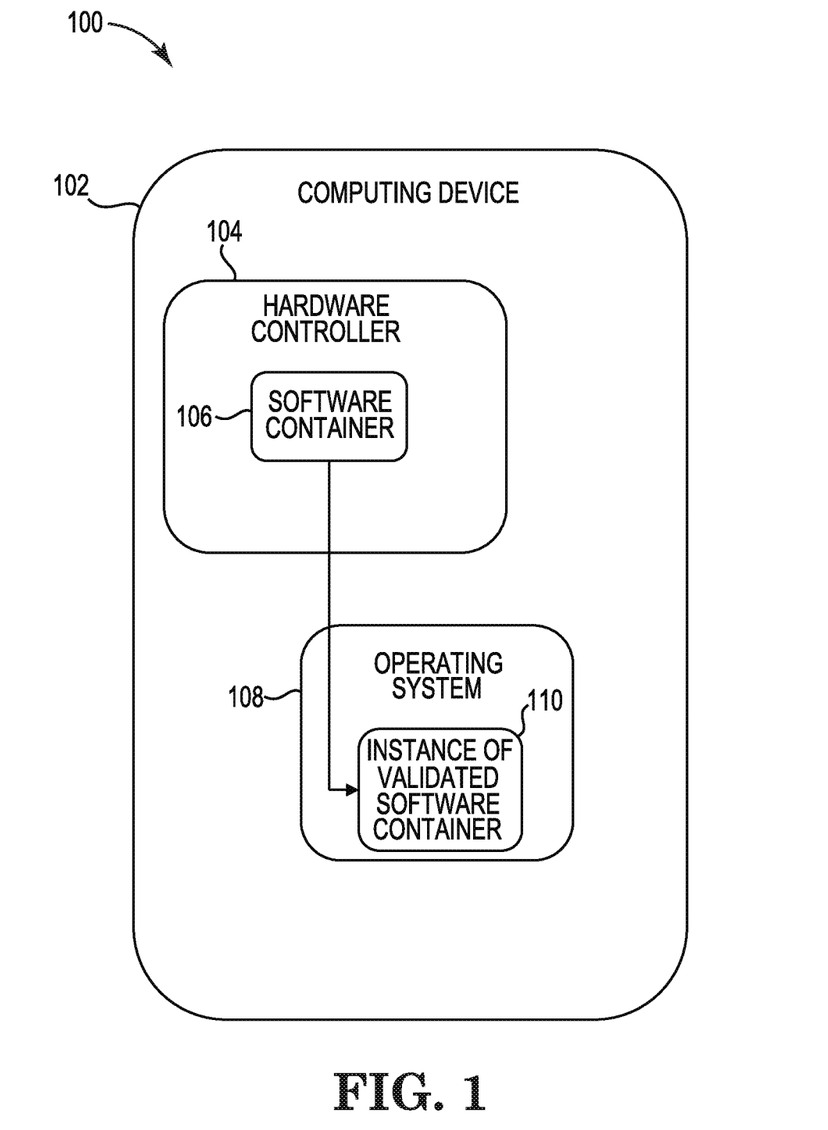
FIG. 1 illustrates an example of a system for utilizing a software container consistent with the present disclosure.

FIG. 1 illustrates an example of a system 100 for utilizing a software container 106 consistent with the present disclosure. The described components and/or operations of the system 100 may include and/or be interchanged with the described components and/or operations described in relation to FIG. 2-FIG. 4.

The system 100 may include a computing device 102. A computing device 102 may include a desktop computer, a notebook computer, a tablet computer, a thin client, a smartphone, a smart device, a wearable computing device, a smart consumer electronic device, a server, a virtual machine, a distributed computing platform, and Internet-of-things (IOT) device, etc. The computing device may include a processor and a non-transitory machine-readable storage medium. The machine-readable storage medium may store instructions. The instructions may be executable by the processor to perform the various functionalities described herein.

The computing device 102 may include a hardware controller 104. The hardware controller 104 may be a hardware controller 104 that is embedded in the computing device 102. The hardware controller 104 may, for example, be collocated and/or embedded on a motherboard of the computing device 102.

The hardware controller 104 may include a trusted platform module (TPM). For example, the hardware controller 104 may include a dedicated microcontroller designed to secure hardware of the computing device 102 through integrated cryptographic keys. The hardware controller 104 may include a cryptographic processor and/or a memory component.

The hardware controller 104 may utilize cryptographic methods to ensure platform integrity throughout the entire boot process until applications are running. The hardware controller 104 may store Rivest-Shamir-Adelman (RSA) type encryption keys specific to the host system for hardware authentication. For example, the hardware controller 104 may include an RSA key pair endorsement key (EK). The pair may be maintained inside the hardware controller 104 and may not be accessible by software instructions executing on the computing device 102. For example, a storage root key (SRK) may be created when a user or administrator takes ownership of the computing device 102. The key pair may be generated by the hardware controller 104 based on the EK and/or an owner-specified password.

The hardware controller 104 may include and/or utilize an attestation identity key (AIK) to protect the computing device 102 against unauthorized firmware and/or software instructions modification by hashing sections of firmware and software instructions before they are executed The hardware controller 104 may be utilized as the basis for a hardware-based Root of Trust serving as the foundation for many of the security capabilities of the computing device 102. The Root of Trust may be based on a unique element in the hardware that cannot be replicated or duplicated by anyone who is trying to make a copy of the hardware controller 104. For example, the Root of Trust may include a cryptographic key or physically unclonable functions that is unique to just that one instance of a hardware controller 104. For example, the Root of Trust may utilize the encryption keys of the hardware controller 104 as the basis for the foundation of the security capabilities.

The hardware controller 104 may be shipped to an end user, owner, administrator, etc. with the computing device 102. That is, for example, the hardware controller 104 may be installed in the computing device 102 as part of the manufacturing process of the computing device 102. For example, the computing device 102 may be assembled by a manufacturer, vendor, distributor, etc. to include the hardware controller 104 such that when the computing device 102 is purchased, leased, etc. by the end user, owner, administrator, etc. possession of the computing device 102, with the hardware controller 104 integrated, may be transferred to the end user, owner, administrator, etc.

The system 100 may include a software container 106. As used herein, the term software container may include a container image including application instructions and dependencies packaged together into a single manifest which may be version controlled. For example, the software container 106 may include an entire runtime environment for application execution include application instructions, application dependencies, application libraries and other binaries, application configuration files to run the application, etc. all bundled into a single container. The software container 106 may also include a driver for consumption by the computing device 102 to operate connected devices and/or instructions. The software container 106 may also include an OS certificate for the operating system 108 of the computing device 102.

In contrast to a software container stored on a remote server that is retrieved by the computing device 102 over a network connection for execution from the cloud or from a hard drive of the computing device 102, the system 100 may provide a "ship-on-chip" approach to software container 106 acquisition, utilization, retention, etc. at the computing device 102. That is, the software container 106 may be stored on, validated by, and/or retrieved for execution from the hardware controller 104.

For example, the software container 106 may be stored and/or reside on the hardware controller 104. That is, the software container 106 may be physically stored on the hardware controller 104, for example, on a storage or memory component of the hardware controller 104. The storage location of the software container 106 on the hardware controller 104 may not be accessible by or used as a storage location for other applications or operating systems executing on the computing device 102. That is, the software container 106 may be stored on the hardware controller 104 sequestered from the other storage and/or processing resources of the computing device 102 outside of the hardware controller 104.

The software container 106 may be stored on the hardware controller 104 prior to shipping the computing device 102 to an end user. For example, the software container may be stored on the hardware controller 104 prior to possession of the computing device 102, with the hardware controller 104 integrated, being transferred to the end user, owner, administrator, etc. As such, the software container 106 may be stored on the hardware controller 104 by the manufacturer, vendor, distributor, etc. prior to transferring possession to the end user. That is, in contrast to an end user utilizing a network connection to connect the computing device 102 to a remote server to retrieve the software container 106 to a storage disk of the computing device 102, a software container 106 may come preloaded on the hardware controller 104 of the computing device from the perspective of a consumer or administrator.

The software container 106 may include a container image including application instructions, application dependencies, application libraries and other binaries, application configuration files to run the application, etc. that are not initially a part of or inserted into the operating system 108 or a physical disk of the computing device 102. That is, the software container 106 may exist in the computing device 102, at least initially, solely on the hardware controller 104.

The software container 106 may be electronically signed by a manufacturer, vendor, distributor, etc. of the software container 106. For example, the software container 106 may be electronically signed utilizing a specialized security key that is unique to the specific computing device 102 and/or an organization or administrator managing the computing device 102. The software container 106 may be electronically signed by the manufacturer, vendor, distributor, etc. of the software container 106 prior to and/or at the time of its addition to the hardware controller 104.

The electronic signature may include a cryptographic signature utilizable to validate the authenticity of the contents of the software container 106 and/or the manufacturer, vendor, distributor, etc. of the software container 106. For example, the electronic signature may be validated by the hardware controller 104 by checking the signature against the cryptographic keys stored in the hardware controller 104. As such, the electronic signature may be based on and/or able to be validated by the unique element of the Root of Trust (e.g., the Root of Trust function, cryptographic keys, etc.) in the hardware controller 104 that cannot be replicated or duplicated by anyone who is trying to make a copy of the hardware controller 104.

The software container 106 may be encrypted. That is, the software container 106 and/or the contents (e.g., payload) of the software container 106 may be encrypted. For example, the software container 106 may be cryptographically encoded in such a way that limits access to the software container 106 and/or its contents to authorized parties. That is, in order to access and/or utilize the software container 106 and/or its contents 106, a portion of the software container 106 and/or its contents may have to be decrypted utilizing a secret key. For example, the software container 106 and/or its contents may be encrypted, by the manufacturer, vendor, distributor, etc. of the software container 106 prior to and/or at the time of its addition to the hardware controller 104, based on the unique element of the Root of Trust (e.g., the Root of Trust function, cryptographic keys, etc.) in the hardware controller 104 that cannot be replicated or duplicated by anyone who is trying to make a copy of the hardware controller 104. As such, the software container 106 and/or its contents may be decrypted by the software container 106 utilizing the unique element of the Root of Trust (e.g., the Root of Trust function, cryptographic keys, etc.) in the hardware controller 104 that cannot be replicated or duplicated by anyone who is trying to make a copy of the hardware controller 104.

Additionally, access to the software container 106 may controlled. That is, just particular computing devices 102, users, etc. may be authorized to access and/or utilize an instance of the software container 106. For example, a user, administrator, computing device 102, etc. may have a limited amount of licenses and/or permissions that may be utilized or that have been granted for use at a computing device. A certificate of authority may specify whether a computing device 102, user, etc. has permission to access and/or utilize an instance of the software container instantiated from the software container 106 image stored on the hardware controller 104 at the computing device 102. The certificate of authority for the computing device 102 may be stored on and/or accessible by the hardware controller 104. As such, the hardware controller 104 may determine whether the computing device 102 and/or a user conducting a session on the computing device 102 is authorized to access and/or utilize an instance of the software container 106.

The software container 106 may be validated prior to instantiating an instance of the software container 106 to accessed and/or utilized at the computing device 102. For example, prior to instantiating, from the software container 106 stored on the hardware controller 104, an instance of the software container to be accessed and/or utilized by components of the computing device 102 outside of the hardware controller 104, the software container 106 may have to be validated.

The software container 106 may be validated by the hardware controller 104. For example, the hardware controller 104 may validate the software container 106 utilizing an encryption mechanism specific to the computing device such as the Root of Trust keys, Root of Trust cryptographic keys, and/or a certificate of authority stored on the hardware controller 104. For example, the hardware controller 104 may validate the software container 106 stored on the hardware controller 104 by validating the electronic signature of the software container 106, decrypting the software container 106 itself and/or its contents, and/or determining that the computing device 102 and/or user has authorization to access and/or utilize the software container utilizing the Root of Trust keys, Root of Trust cryptographic keys, and/or a certificate of authority stored on the hardware controller 104, as described above.

If the software container 106 is not successfully validated by the hardware controller 104, access to and/or utilization of the software container 106 may be rejected. For example, if the electronic signature of the software container 106 is not validated by the cryptographic key and/or cryptographic function, the software container 106 and/or its contents are not successfully decrypted using the cryptographic key and/or cryptographic function, and/or the computing device 102 and/or user does not have authorization to access and/or utilize the software container 106 according to the certificate of authority, access to and/or utilization of the software container 106 may be rejected. As such, an instance of the software container 106 may not be instantiated in such examples.

If the software container 106 is successfully validated by the hardware controller 104, access to and/or utilization of the software container 106 may be permitted. For example, if the electronic signature of the software container 106 is validated by the cryptographic key and/or cryptographic function, the software container 106 and/or its contents are successfully decrypted using the cryptographic key and/or cryptographic function, and/or the computing device 102 and/or user is determined to have authorization to access and/or utilize the software container 106 according to the certificate of authority, access to and/or utilization of the software container 106 may be permitted. As such, an instance of the software container 106 may be instantiated in such examples.

For example, responsive to a successful validation of the software container 106, an instance of the validated software container 110 may be instantiated from the software container 106 stored in the hardware controller 104. For example, the instance of the validated software container 110 may be inserted into the operating system 108 of the computing device 102. As used herein, insertion of the instance of the validated software container 110 may include an instantiation of the instanced of the validated software container 110 into the operating system 108 for execution. In some examples, the hardware controller 104 may push the instance of the validated software container 110 from the hardware controller 104 to the operating system 108. In some examples, the operating system 108 may pull the instance of the validated software container 110 from the hardware controller 104.

In some examples, the instance of the validated software container 110 may be pushed or pulled to the operating system 108 responsive to detecting an action taken utilizing the operating system 108. For example, the instance of the validated software container 110 may be pushed or pulled to the operating system 108 responsive to request for access to and/or an action implicating a service associated with the software container 106.

In some examples, the instance of the validated software container 110 may be pushed or pulled to the operating system 108 responsive to detecting a state of an operating system 108. For example, when a startup, a resume, or a restart of activity by the operating system is detected, the instance of the validated software container 110 may be pushed or pulled to the operating system 108. For example, the operating system 108 may start up, and its activity may be detected. A container daemon of the operating system 108 may pull the instance of the validated software container 110 into the operating system 108. The instance of the validated software container 110 may be started inside of the operating system 108.

As such, the user may have access to the functionality and/or service provided by an execution of the instance of the validated software container 110 utilizing a secure process isolated to the computing device 102. That is, the instance of the validated software container 110 may have been inserted into the operating system 108 without having to be retrieved from external sources over a network. Further, the software container 106 and its validation process may have been securely isolated to the hardware controller 104 and not involving processes and/or a software container in the relatively more exposed physical disks of the computing device 102.

Figure 2:
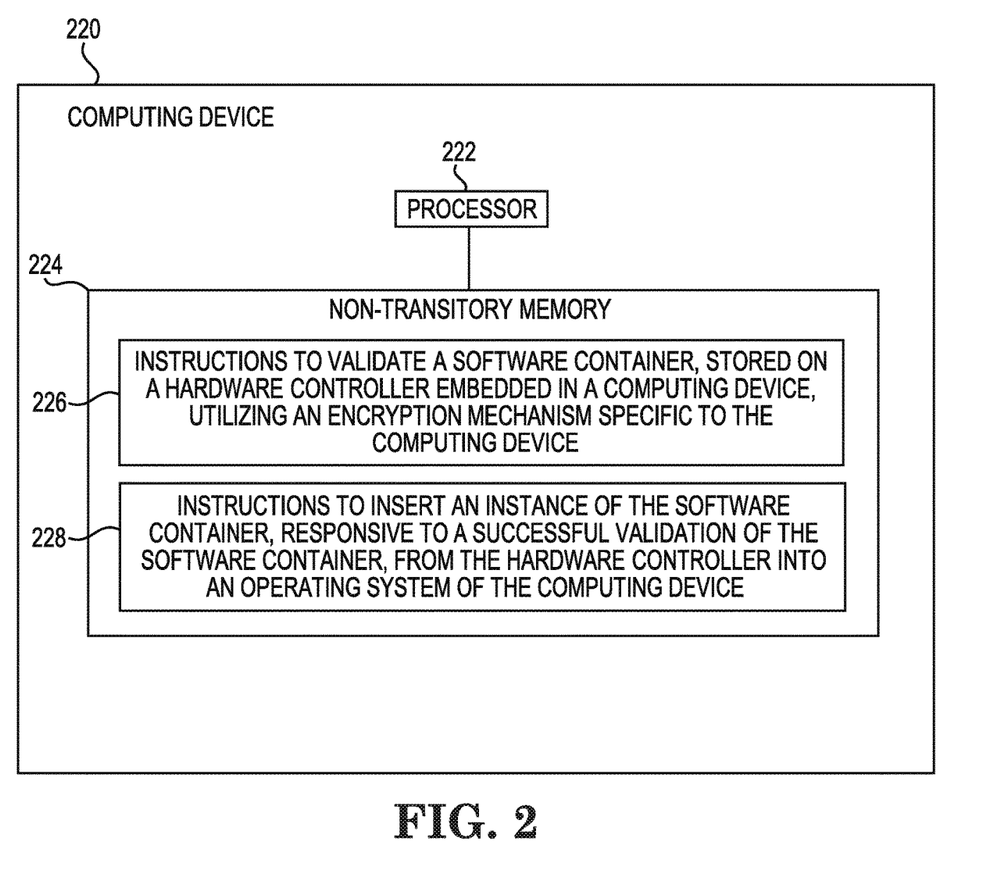
FIG. 2 illustrates an example of a computing device for utilizing a software container consistent with the present disclosure.

FIG. 2 illustrates an example of a computing device 220 utilizing a software container 106 consistent with the present disclosure. The described components and/or operations described with respect to the computing device 220 may include and/or be interchanged with the described components and/or operations described in relation to FIG. 1 and FIG. 3-FIG. 4.

The computing device 220 may include a desktop computer, a notebook computer, a tablet computer, a thin client, a smartphone, a smart device, a wearable computing device, a smart consumer electronic device, a server, a virtual machine, across a distributed computing platform, etc. The computing device 220 may include a processor 222 and a non-transitory memory 224. The non-transitory memory 224 may include a non-transitory machine-readable storage medium to store instructions (e.g., 226, 228, etc.) that when executed by the processor 222, cause the computing device 220 to perform various operations described herein. While the computing device 220 is illustrated as a single component, it is contemplated that the computing device 220 may be distributed among and/or inclusive of a plurality of such components. Further, the processor 222, the non-transitory memory 224, and/or the instructions (e.g., 226, 228, etc.) may be components of a hardware controller.

The computing device 220 may execute the instructions 226 to validate a software container. The software container may be an image of a software container stored on a hardware controller embedded in the computing device 220. The software container may be saved to the hardware controller by the manufacturer, vendor, distributor, etc. of the software container and/or the computing device 220 prior to transferring the computing device 220 to an end user.

The software container may be validated by the hardware controller utilizing an encryption mechanism specific to the computing device 220. For example, the hardware controller may include a TPM module. For example, the hardware controller may be a Root of Trust controller embedded in the motherboard of the computing device 220. As such, the encryption mechanism specific to the computing device 220 may include a Root of Trust key set and/or Root of Trust function stored at the hardware controller.

As such, the hardware controller may be equipped with an encryption mechanism specific to the computing device such as a cryptographic key and/or a cryptographic function that is uniquely assigned to the hardware controller, the computing device 220, and/or an administrator of the computing device 220. The encryption mechanism specific to the computing device may be securely stored by the hardware controller and may not be accessible or known to components outside of the hardware controller.

The software container may be electronically cryptographically signed and/or encrypted (e.g., the software container and/or the payload of the software container) in a manner that is specific to the computing device 220 and/or is based on being able to be validated and/or decrypted utilizing the encryption mechanism specific to the computing device 220.

Validating the software container may include validating, with the hardware controller, the electronic signature of the software container utilizing the encryption mechanism specific to the computing device 220. Validating the software container may include decrypting, with the hardware controller, the software container and/or its payload utilizing the encryption mechanism specific to the computing device 220. Validating the software container may include determining, with the hardware controller, that the computing device 220 is authorized to access and/or utilize an instance of the software container based on the certificate of authority for the computing device 220.

The computing device 220 may execute the instructions 228 to insert the software container from the hardware controller into an operating system. As described above, the insertion of the software container from the hardware controller into the operating system may include instantiating an instance of the software container to be pushed or pulled into the operating system for execution. The insertion of an instance of the software container may be responsive to a successful validation of the software container. Alternatively, if the validation is unsuccessful, the insertion of an instance of the software container into the operating system may be rejected. An inserted instance of the validated software container may execute utilizing the resources of the operating system of the computing device 220 to provide a user a service or application by the instance of the software container.

Figure 3:
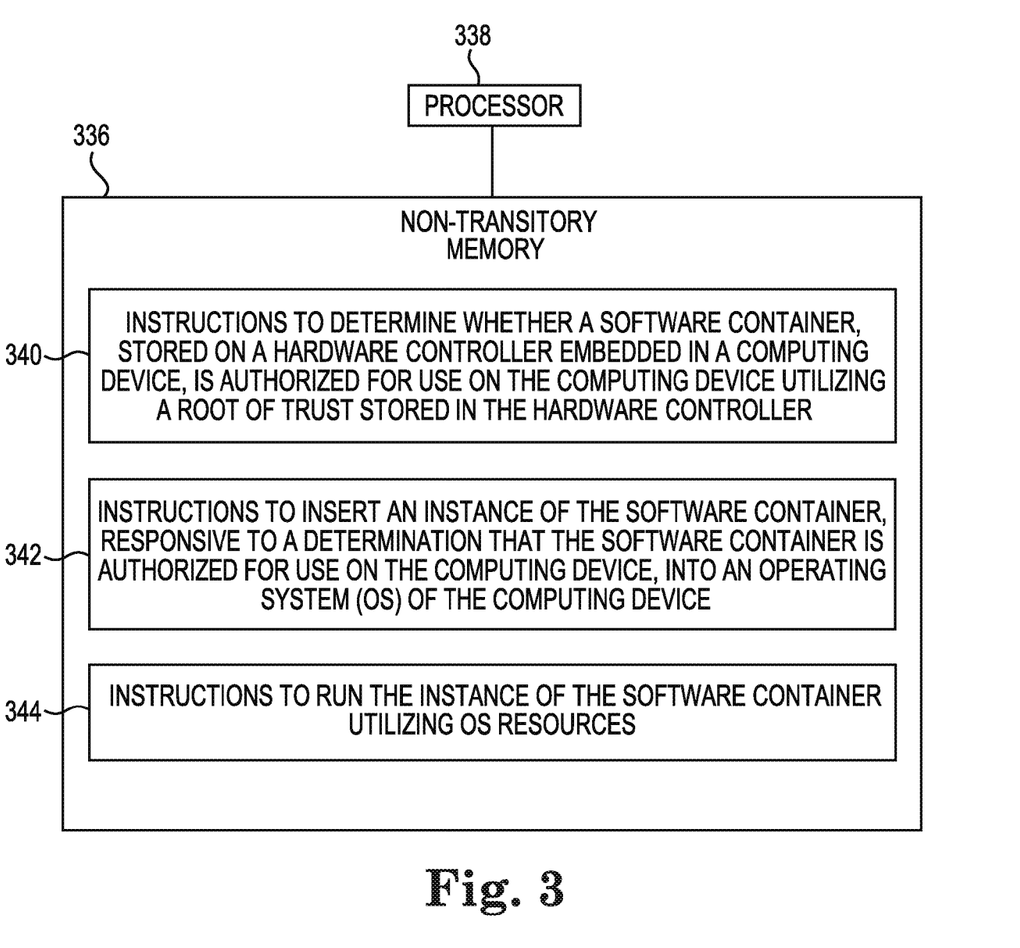
FIG. 3 illustrates an example of a non-transitory machine-readable memory and processor for utilizing a software container consistent with the present disclosure.

FIG. 3 illustrates an example of a non-transitory machine-readable memory and processor for utilizing a software container consistent with the present disclosure. A memory resource, such as the non-transitory machine-readable memory 336, may be utilized to store instructions (e.g., 340, 342, 344, etc.). The instructions may be executed by the processor 338 to perform the operations as described herein. The operations are not limited to a particular example described herein and may include and/or be interchanged with the described components and/or operations described in relation to FIG. 1-FIG. 2 and FIG. 4.

The non-transitory machine-readable memory 336 may store instructions 340 executable by the processor 338 to determine whether a software container is authorized for use on a computing device. The software container may be a software container image stored on a hardware controller embedded in the computing device. The software container may be preloaded onto the hardware controller of the computing device before the computing device is sold and/or shipped to an end user.

Determining whether a software container is authorized for use on the computing device may be performed utilizing a Root of Trust stored in the hardware controller. A Root of Trust may include a cryptographic key and/or function that may be utilized by the hardware controller to cryptographically determine whether a software container is authorized for use on the computing device.

For example, determining whether a software container is authorized for use on the computing device may be accomplished by decrypting and/or cryptographically verifying an electronic signature of the software container utilizing the Root of Trust. It may be determined that the software container is authorized for use on the computing device if the electronic signature is successfully cryptographically verified and/or decrypted utilizing the Root of Trust. It may be determined that the software container is not authorized for use on the computing device if the electronic signature is not successfully cryptographically verified and/or decrypted utilizing the Root of Trust.

In some examples, determining whether a software container is authorized for use on the computing device may be accomplished by decrypting and/or cryptographically verifying an encrypted software container and/or its encrypted contents (e.g., payload) utilizing the Root of Trust. It may be determined that the software container is authorized for use on the computing device if the encrypted software container and/or its encrypted contents are successfully cryptographically verified and/or decrypted utilizing the Root of Trust. It may be determined that the software container is not authorized for use on the computing device if the encrypted software container and/or its encrypted contents are not successfully cryptographically verified and/or decrypted utilizing the Root of Trust.

In some examples, determining whether a software container is authorized for use on the computing device may be accomplished by checking permissions of the computing device for the software container against a device owner certificate of authority in the Root of Trust to determine whether the use of the software container is authorized. It may be determined that the software container is authorized for use on the computing device if the certificate of authority in the Root of Trust reflects that the computing device is authorized to access and/or utilize the software container. It may be determined that the software container is not authorized for use on the computing device if the certificate of authority in the Root of Trust does not reflect that the computing device is authorized to access and/or utilize the software container.

The non-transitory machine-readable memory 336 may store instructions 342 executable by the processor 338 to insert an instance of the software container into the operating system of the computing device responsive to a determination that the software container is authorized for use on the computing device. In some examples, an instance of the validated software container may be pulled into the operating system from the hardware controller. In some examples, an instance of the validated software container may be pushed from the hardware controller to the operating system.

The non-transitory machine-readable memory 336 may store instructions 344 executable by the processor 338 to run the instance of the software container at the computing device. For example, the instance of the validated software container may be run utilizing the resources of the operating system of the computing device. For example, the instance of the validated software container may be executed utilizing the operating system kernel to provide memory resources and processing resources to execute the instance of the validated software container.

The insertion of the instance of the validated software container into the operating system may be a temporary insertion of the instance of the validated software container. That is, the instance of the validated software container inserted into the operating system may be removed. For example, the instance of the validated software container may be removed from the operating system responsive to an initiation of a shutdown of the operating system. That is, the instance of the validated software container that was inserted into the operating system may not be retained outside of the hardware controller upon the shutdown of the operating system. The software container image from which the instance was instantiated may be retained in the hardware controller before, during, and/or after insertion into the operating system and may not be removed therefrom regardless of the state of the operating system and/or an operating system session.

As such, the software container may be revalidated and/or an instance of it may be reinserted into the operating system the next time the operating system is started. For example, the software container may be revalidated and/or an instance of it may be reinserted into the operating system from the hardware controller responsive to a start of the operating system subsequent to the shutdown of the operating system.

In such examples, the instances of the software containers may be stateless and temporary with respect to the operating system, but the source software container images may always be re-instantiated/reinserted at a later time as they are retained, along with their validation mechanisms, on the hardware controller. Furthermore, the software container image may be resistant to being deleted on accident or on purpose. For example, if a physical disk of the computing device is reformatted, the software container images will be retained at and/or repopulated from the hardware controller. Further, even if a user manually deletes the instance of the software container from the operating system and/or the physical disk of the computing device, the software container images will be retained at and/or repopulated from the hardware controller. That is, the software container images may not be able to be deleted or lost from the computing device. Instead, instances of the software containers may be reinserted into the operating system from the hardware controller responsive to a start of the operating system subsequent to a manual deletion of the software container from the OS by a user.

Figure 4:
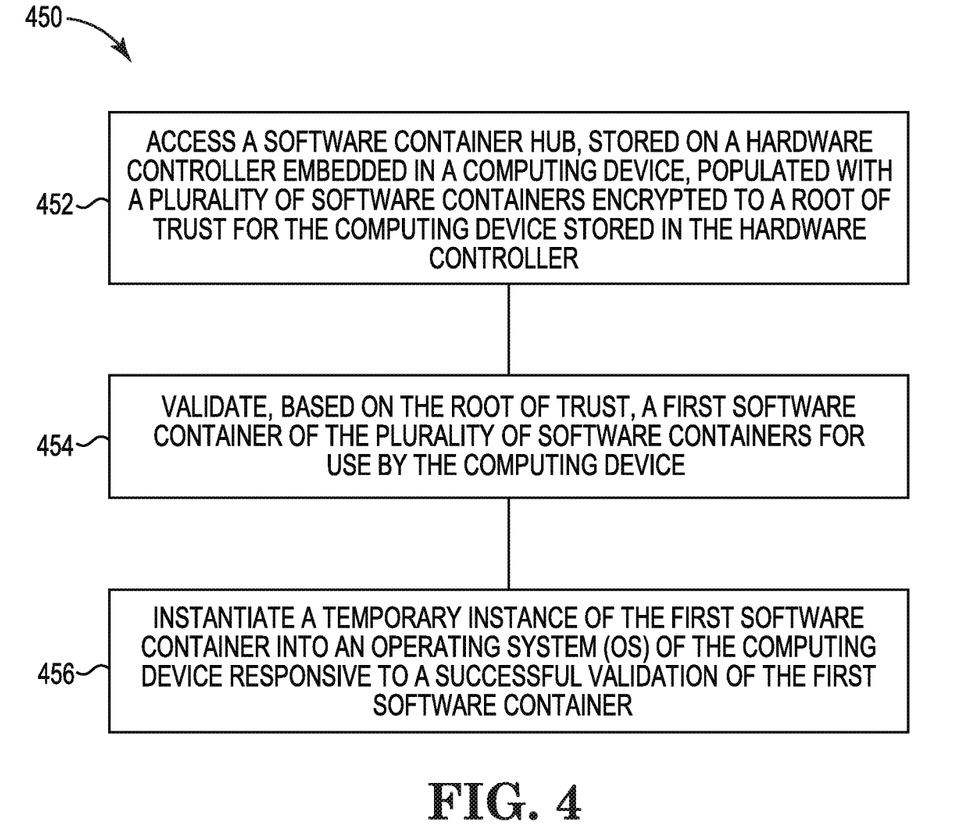
FIG. 4 illustrates an example of a method for utilizing a software container consistent with the present disclosure.

FIG. 4 illustrates an example of a method 450 for utilizing a software container consistent with the present disclosure. The described components and/or operations of method 450 may include and/or be interchanged with the described components and/or operations described in relation to FIG. 1-FIG. 3.

At 452, the method 450 may include accessing a software container hub. The software container hub may include a portion of a hardware controller, embedded in a computing device, populated with a plurality of software containers. The software container hub may be populated by the developer, vendor, and/or distributor of the software container and/or the computing device prior to shipping the computing device to an end user. That is, the software container hub may come pre-populated with software containers without having the software containers loaded on the physical disk and/or retrieved from a remote network location.

The plurality of software containers may be securely stored on the hardware controller isolated from applications and/or the operating systems of the computing system. Further, each of the software containers may be encrypted to a Root of Trust for the computing device. The Root of Trust may be stored at the hardware controller as well.

At 454, the method 450 may include validating a first software container of the plurality of software containers for user by the computing device. The first software container may be validated by the hardware controller. The hardware controller may validate the software container utilizing the Root of Trust stored at the hardware controller.

At 456, the method 450 may include inserting a temporary instance of the first software container into an operating system of the computing device. Inserting an instance of the first software container into the operating system may include instantiating a new instance of the first software container into the operating system. The temporary instance may be inserted in the operating system responsive to a successful validation of the first software container. The instance of the validated software container may be temporary in that it may be instantiated into operating system when the operating system is started and/or the software container is requested but it may be removed from the operating system when the operating system is shutdown and/or the instance of the software container is no longer being utilized. However, the first software container may be retained in the hardware controller regardless of the execution of the operating system and/or execution of the copy of the validated software container.

In addition, the method 450 may include inserting a temporary instance of the first software container into an operating system of another computing device that is communicatively coupled to the computing device. That is, responsive to a successful validation of the first software container, a temporary instance may be instantiated into an operating system of other computing devices that are communicatively coupled to the computing device with the embedded hardware controller. For example, the software container hub may be embedded in a computing device of an administrator of a plurality of computing devices that are communicatively connected. The first software container on the hardware controller of the administrator's computing device may be validated by the hardware controller of the administrator's computing device. Once validated, temporary instances of the first software container may be instantiated at a portion of the plurality of computing devices managed by the administrator.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure. Further, as used herein, "a plurality of" an element and/or feature can refer to more than one of such elements and/or features.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

What is claimed:

1. A system, comprising:
a processor; and
a non-transitory machine-readable storage medium to store instructions executable by the processor to:
prior to insertion of an instance of a software container into an operating system (OS) of a computing device, validate the software container utilizing an encryption mechanism specific to the computing device, wherein (i) the software container is stored on a hardware controller embedded within the computing device and (ii) the encryption mechanism is stored on the hardware controller embedded within the computing device, wherein the encryption mechanism is inaccessible to the OS of the computing device, and wherein validation of the software container is isolated to the hardware controller; and
responsive to a successful validation of the software container, insert an instance of the software container from the hardware controller into the OS of the computing device, wherein the operating system of the computing device executes the instance of the software container.

2. The system of claim 1, wherein the hardware controller is a trusted platform module.

3. The system of claim 1, wherein the encryption mechanism is a root of trust function stored at the hardware controller.

4. The system of claim 1, including instructions executable by the processor to reject an insertion of the instance of the software container into the operating system responsive to an unsuccessful validation of the software container.

5. The system of claim 1, wherein the software container is stored on the hardware controller by a manufacturer prior to transferring the computing device to an end user.

6. The system of claim 1, wherein the encryption mechanism is unique to the hardware controller.

7. The system of claim 1, wherein the encryption mechanism includes a physically unclonable function that is unique to a single instance of the hardware controller.

8. The system of claim 1, wherein a storage location of the software container is inaccessible from outside of the hardware controller.

9. A non-transitory machine-readable storage medium comprising instructions executable by a processor to:
prior to insertion of an instance of a software container into an operating system (OS) of a computing device, determine whether the software container is authorized for use on the computing device utilizing a root of trust stored in a hardware controller embedded in the computing device, wherein the software container is also stored in the hardware controller embedded in the computing device such that both the root of trust and the software container are stored in the same hardware controller embedded in the computing device, wherein the root of trust is inaccessible to the OS of the computing device, and wherein authorization of the software container is isolated to the hardware controller;
responsive to a determination that the software container is authorized for use on the computing device, insert the instance of the software container into the OS of the computing device; and
run the instance of the software container utilizing OS resources.

10. The non-transitory machine-readable storage medium of claim 9, including instructions executable to remove the instance of the software container from the OS responsive to an initiation of a shutdown of the OS.

11. The non-transitory machine-readable storage medium of claim 10, including instructions executable to insert another instance of the software container into the OS from the hardware controller responsive to a start of the OS subsequent to the shutdown of the OS.

12. The non-transitory machine-readable storage medium of claim 9, including instructions executable to insert another instance of the software container into the OS from the hardware controller responsive to a start of the OS subsequent to a manual deletion of the instance of the software container from the OS by a user.

13. The non-transitory machine-readable storage medium of claim 9, including instructions executable to determine whether the software container is authorized for use by decrypting a signature of the software container utilizing the root of trust.

14. The non-transitory machine-readable storage medium of claim 9, including instructions executable to determine whether the software container is authorized for use by decrypting contents of the software container utilizing the root of trust.

15. The non-transitory machine-readable storage medium of claim 9, including instructions executable to determine whether the software container is authorized for use by checking against a device owner certificate of authority in the root of trust to determine whether the use of the software container was authorized.

16. A method, comprising:
    accessing a software container hub populated with a plurality of software containers encrypted to a root of trust for a computing device, wherein (i) the software container hub is stored on a hardware controller embedded in the computing device and (ii) the root of trust is stored on the hardware controller embedded in the computing device;
    prior to instantiating a temporary instance of a first software container of the plurality of software containers into an operating system (OS) of the computing device, validating, with the hardware controller, based on the root of trust, the first software container of the plurality of software containers for use by the computing device, wherein the root of trust is inaccessible to the OS of the computing device, and wherein validation of the software container is isolated to the hardware controller; and
    instantiating the temporary instance of the first software container into the OS of the computing device responsive to a successful validation of the first software container.

17. The method of claim 16, including populating the software container hub with the plurality of software containers prior to providing the computing device to an end user.

18. The method of claim 16, including instantiating a temporary instance of the first software container into an OS of another computing device communicatively coupled to the computing device responsive to the successful validation of the first software container.

19. The method of claim 16, including instantiating the temporary instance of the first software container into the OS of the computing device responsive to detecting a state of the OS.

20. The method of claim 16, including instantiating the temporary instance of the first software container into the OS of the computing device responsive to a request for access to a service associated with the software container.

* * * * *